(12) United States Patent
Katoot

(10) Patent No.: US 6,294,293 B1
(45) Date of Patent: *Sep. 25, 2001

(54) POLYMER ELECTRICAL STORAGE DEVICE

(75) Inventor: Mohammad W. Katoot, Roswell, GA (US)

(73) Assignee: KT Holdings, LLC, Tucker, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/867,014

(22) Filed: Jun. 3, 1997

Related U.S. Application Data

(63) Continuation of application No. 08/610,572, filed on Mar. 8, 1996, now abandoned.
(60) Provisional application No. 60/004,737, filed on Oct. 2, 1995.

(51) Int. Cl.$^7$ .................................................... H01M 6/18
(52) U.S. Cl. .......................... 429/304; 429/306; 429/300; 429/303
(58) Field of Search ...................................... 429/213, 192, 429/190, 111, 303, 304, 300, 306; 252/500

(56) References Cited

U.S. PATENT DOCUMENTS

| | | | | |
|---|---|---|---|---|
| 3,907,601 | * | 9/1975 | Schaefer | 29/623.1 |
| 4,824,745 | * | 4/1989 | Ogawa et al. | 429/213 |
| 5,030,527 | * | 7/1991 | Carpio et al. | 429/192 |
| 5,137,991 | * | 8/1992 | Epstein | 525/540 |
| 5,232,631 | * | 8/1993 | Cao | 252/500 |
| 5,233,000 | * | 8/1993 | Yodice | 526/258 |
| 5,437,943 | * | 8/1995 | Fujii | 429/192 |
| 5,495,250 | * | 2/1996 | Ghaem | 342/51 |
| 5,518,838 | * | 5/1996 | Bai | 429/191 |
| 5,549,988 | * | 8/1996 | Reichert | 429/192 |
| 5,637,421 | * | 6/1997 | Poehler et al. | 429/190 |
| 5,667,913 | * | 9/1997 | Chen et al. | 429/192 |

OTHER PUBLICATIONS

*Organic Chemistry*. Seyhan Ege. D.C. Heath & Co., p. 268, 1994.*

* cited by examiner

*Primary Examiner*—Carol Chaney
*Assistant Examiner*—Angela J. Martin
(74) *Attorney, Agent, or Firm*—Kirkpatrick Stockton LLP

(57) ABSTRACT

This invention relates to an electrical storage device that is comprised of a polymer composition that is capable of storing an electrical charge. The electrical storage device, in one embodiment, can be recharged by light.

40 Claims, No Drawings

POLYMER ELECTRICAL STORAGE DEVICE

CROSS-REFERENCE TO RELATED APPLICATIONS

This is a continuation of application Ser. No. 08/610,572 filed Mar. 8, 1996, now abandoned, which claims the benefit of U.S. Provisional Application No. 60/004,737 filed Oct. 2, 1995.

TECHNICAL FIELD

This invention relates to an electrical storage device that is comprised of a unique polymer composition. More specifically, this invention relates to an electrical storage device that is comprised of a polymer, is capable of storing and electrical charge, and can be repeatedly recharged quickly and easilly. The electrical storage device, in another embodiment, can be recharged by light.

BACKGROUND OF THE INVENTION

Conventional batteries or electric cells are devices that convert chemical energy into electricity. Most conventional batteries consist of a liquid or a moist electrolyte and an external electric circuit connected between a positive and negative electrode. The electrolyte, a liquid or paste in which a dissolved chemical will dissociate into negative and positive ions, may be a solution of salts, acids or bases; a weak acid solution is commonly used because it conducts electricity for a longer time. The conventional electrodes are usually made of substances that will also dissociate in the electrolyte. Batteries in which the chemicals cannot be reconstituted into the original form once the energy has been converted, that is batteries that cannot be recharged, are called primary cells or voltaic cells. Batteries in which the chemicals can be reconstituted by passing an electric current through the electrolyte in the direction opposite that of the normal cell operation are called secondary cells, storage cells, or accumulators.

The most common form of primary cell is the Leclanche cell. This type of battery is commonly called a dry cell or flashlight battery. The conventional dry cell battery in use today is very similar to the original invention. The negative electrode is made of zinc, as is the outside shell of the cell, and the positive electrode is a thin carbon rod surrounded by a mixture of carbon and manganese dioxide. The dry cell normally produced about 1.5 volts.

Another widely used conventional primary cell is the zinc mercuric oxide cell, more commonly called a mercury battery. It can be made in the shape of a small, flat disc and is used in this form in hearing aids, photoelectric cells, and electric wrist watches. The negative electrode consists of zinc, the positive electrode is of mercuric oxide, and the electrolyte is a solution of potassium hydroxide. The mercury battery commonly produces about 1.34 volts. Secondary cells or rechargeable batteries include the lead acid storage battery. The lead acid battery which consists of three or six cells connected in series, is used in automobiles, trucks, aircraft and other vehicles. Its chief advantage is that it can deliver a strong current of electricity for starting an engine; however, it runs down quickly. The electrolyte is a dilute solution of sulfuric acid, the negative electrode consists of lead, and the positive electrode of lead dioxide. In operation, the negative lead electrode dissociates into free electrons and positive lead ions. The electrons travel through the external electric current and the positive lead ions combine with the sulfate ions in the electrolyte to form a lead sulfate. When the electrons re-enter the cell at the positive lead dioxide electrode, another chemical reaction occurs. The lead dioxide combines with the positive hydrogen ions in the electrolyte and with the returning electrons to form water, releasing lead ions in the electrolyte to form additional lead sulfate.

The lead acid storage cell runs down as the sulfuric acid gradually is converted into water and lead sulfate. When the cell is being recharged, the chemical reactions described above are reversed until the chemicals have been restored to their original condition. A lead acid battery has a useful life of about four years. It produces about two volts per cell.

Another widely used conventional secondary cell is the alkaline cell, or nickel-iron battery, developed by the American inventor, Thomas Edison, in the 1900s. The principle of operation is the same as the lead acid cell except that the negative electrode consists of iron, the positive electrode is of nickel-oxide, and the electrolyte is a solution of potassium hydroxide. The alkaline cell is more expensive than the lead acid battery, and the nickel iron cell has the additional disadvantage of giving off hydrogen gas during charging. The battery is used principally in heavy industry because it can stand rough treatment better than the lead acid batteries, which tend to leak acid. The alkaline cell has a useful life of approximately ten years and produces about 1.15 volts.

Another alkaline cell is the nickel-cadmium cell, or cadmium battery, in which the iron electrode is replaced by one consisting of cadmium. It also produces about 1.15 volts, and its useful lifetime is about twenty-five years. Recent research has yielded several new types of batteries primarily designed for use in electrical vehicles. Improved versions of conventional storage batteries have been developed for electric cars, but they still suffer the drawbacks of either short range, high expense, bulkiness, or extensive environmental problems. Batteries which show promise for use in electrical vehicles include lithium-iron sulfide, zinc chloride, and sodium sulfur. These batteries are also being developed by electric utilities to be used for load leveling as a reserve to respond quickly to additional demands, and to compensate for momentary system load fluctuations. Such battery modules can be installed close to sites of fluctuating demand and are independent of each other.

Finally, another class of batteries are the solar batteries. Solar batteries produce electricity by photoelectric conversion process. The source of electricity is a photosensitive semiconducting substance such as a silicon crystal to which impurities have been added. When the crystal is struck by light, electrons are dislodged from the surface of the crystal and migrate toward the opposite surface. There they are collected as a current of electricity. Solar batteries have very long lifetimes and are used chiefly in spacecraft as a source of electricity to operate the equipment load. Solar batteries are also being used to power vehicles. However, current solar batteries are relatively inefficient and only produce electricity when struck by strong light such as sunlight.

All of the conventional batteries suffer from serious drawbacks. Another problem with conventional batteries is in recharging the battery. Normally, a battery is recharged by forcing a current into the battery. However, this technique, while simple, can cause excessive heating of the battery, excessive gassing and require a prolonged time to fully recharge the battery.

A rechargeable battery, once discharged, requires recharging to restore energy to the battery. Several hours, or more, are typically required to recharge a battery because a conventional battery recharger cannot deliver a high charging current without causing overheating of the battery. As is well known in the art, overheating a battery dramatically reduces the life of the battery.

Another problem with conventional batteries is that they require formatting. Depending on the size and type of the battery, this may require twelve hours to several days. The electrolyte is placed in the battery and some electrolyte is absorbed by the plates. The initial chemical reaction generates a great deal of heat, and the battery temperature may easily reach 170° F. Once the electrolyte is absorbed by the plates, the temperature will begin to fall, thereby indicating that the absorption (pickling) time is over, and the battery is ready for formation. An electrolyte temperature of 135° F. to 145° F. is desirable for battery formation.

Finally, a serious problem with any of the conventional-type batteries, is the gradual decrease in efficiency after charging. What is needed in the industry is an electrical storage device that is rapidly rechargeable, has no environmentally unsafe components, or chemicals, and is light weight.

SUMMARY OF THE INVENTION

The present invention is a polymer electrical storage device that is capable of storing an electrical charge. The storage device comprises a hydrocarbon polymer and a solid or gel electrolyte. The polymer has optionally a polypyrrole backbone and is prepared by electrosynthesis on a stainless steel plate. In one embodiment, the polymer can be layered between molecular layers of iron chloride $FeCl_2$ thereby increasing the density of the rechargeable polymer in the film. Another embodiment of the present invention is rechargeable by ordinary light.

The present invention also includes methods of making the polymeric electrical storage device and the polymeric composition which comprises the polymeric storage device. In all disclosed embodiments, the backbone polymer is preferably polypyrrole. However, it is to be understood that other polymers can be used as the backbone polymer. In one embodiment, the polymeric storage device can be recharged simply by forcing a current through the battery. Recharging can be done in several minutes and the storage device will hold a charge substantially indefinitely until use. The electrical storage device of the present invention can be recharged many times. In another embodiment, the polymeric storage device can be recharged using ordinary light. In this embodiment, recharging by light only takes several minutes.

The polymeric storage device is light in weight, and does not contain any environmentally hazardous components. Thus, the polymeric storage device of the present invention can be easily disposed of if necessary.

Accordingly, it is an object of the present invention to provide a completely polymer electrical storage device that can deliver an electric current over a period of time and that is easily and quickly rechargeable.

It is a further object of the present invention to provide a polymer electrical storage device which is capable of storing an electrical charge.

It is a further object of the present invention to provide a polymer electrical storage device that is light in weight and will not readily degrade with use.

It is yet another object of the present invention to provide a polymer electrical storage device that is not hazardous to the environment.

It is yet another object of the present invention to provide a polymer electrical storage device that can be recharged by visible light.

These and other objects, features and advantages of the present invention will become apparent after a review of the following detailed description of the disclosed embodiments and the appended claims.

DETAILED DESCRIPTION

The present invention is a polymer electrical storage device that is capable of storing an electrical charge. The polymer electrical storage device of the present invention comprises a hydrocarbon polymer and a solid or gel electrolyte. The polymer electrical storage device preferably has a polypyrrole backbone and is preferably prepared by electrosynthesis on a stainless steel plate. Optionally, the polymer can be layered between molecular layers of $FeCl_2$, thereby increasing the density of the chargeable polymer in the film.

In another embodiment, the polymer electrical storage device can be recharged by exposure to light. In all embodiments, the polymer electrical storage device can be recharged in a matter of minutes, and the charge will last for several hours depending on the load applied to the battery.

The polymer electrical storage device of the present invention is, in one embodiment, a thin polymer film that is several millimeters thick. By way of example, a polymer electrical storage device that is approximately 1 cm square and 4 mm thick, produces similar voltage to a AAA battery. The capacity of the battery is generally proportional to the size of the polymer being produced.

The present invention comprises the polymer electrical storage device which, as stated above, has a backbone of polypyrrole and is produced, in one embodiment, by electropolymerization of the pyrrole monomer in the presence of acetonitrile (5% water) on a stainless steel plate. Voltage is applied to the plate for ten seconds and then is lowered and applied for approximately twelve minutes. P-toluene sulfonic acid is then added and voltage is applied to the plate for approximately two hours. The resulting polymerized polymer, which is in the form of a film, is then removed and rinsed with acetonitrile. To increase the density of the film, the resulting polymer film is immersed in one molar $FeCl_2$ for approximately twenty seconds at room temperature. The film is then removed from the solution and the excess iron chloride solution is removed by washing with acetonitrile. The membrane is then soaked in aniline-ethyl acetate (50:50 wt %) for twenty minutes. The last process is repeated five to ten times. The resulting layered film is then immersed in 1 molar $Al_2(SO_4)_3$ and four volts is applied for twenty minutes.

A second part of the polymer electrical storage device that is considered part of the present invention, is a solid electrolyte composition. The solid electrolyte is generally prepared by dissolving polyacrylic acid in water to form a gel. Polyvinyl alcohol is then added and, after mixing, phosphoric acid is then added. The resulting solution is non-viscous. Polyacrylic acid is then added until a viscous gel is formed. The polyacrylic acid is then polymerized and the resulting solid electrolyte is then applied to the film.

In another embodiment of the present invention, wherein the polymer electrical storage device can be charged by exposure to light, the light sensitive polymer is prepared by mixing pyrrole and mercaptan in acetonitrile. A cathode is introduced into the solution and two anodes are positioned on either side of the cathode. Two volts is applied to the electrodes for two hours. After two hours, a film has formed on the cathode. The cathode is then rinsed in water and placed in another beaker containing acetonitrile, pyrrole, sodium chloride, and water. At room temperature there is a phase separation. The cathode is positioned so that the upper part of the cathode is in the upper phase of the two solutions. Five volts is applied to the anodes for two hours and a polymer builds in the upper acetonitrile phase. The polymerization is allowed to proceed until a film of approximately 4 mm thick is prepared. It is noted that as the polymerization process proceeds, the polymer first builds up at the interface of the two phases in the solution and secondarily builds toward the bottom of the anode.

For this embodiment, the preferred gel electrolyte is prepared by dissolving to saturation zinc chloride in an aqueous polyvinyl alcohol. The polyvinyl alcohol is a solution of 50% polyvinyl alcohol and 50% water. Acrylic acid is added until a gel is formed and the polyacrylic acid is then co-polymerized with zinc chloride. The anode in this particular embodiment of the present invention is a zinc-coated steel plate. The cathode is the new polymer. The gel electrolyte is the electrolyte contact between the cathode and the anode. The resulting polymer electrical storage device will deliver 300 milliamps at one 1.4 volts.

As can be seen from the above description, the polymer electrical storage device is extremely small and is light in weight. It should be noted that the polymer electrical storage device of the present invention can be recharged repeatedly without degradation of the polymer. In experiments conducted by the inventor, no degradation of the polymer electrical storage device is observed, even after multiple chargings. The polymer electrical storage device of the present invention can be used in any device which requires electrical energy to function. This includes devices such as flashlights, recorders, camcorders, and the like. As stated above, the polymer electrical storage device of the present invention can be prepared in a large format thereby allowing the present invention to be used in industrial applications such as electric vehicles, batteries for electric utilities for load leveling, and the like.

Because in at least one embodiment of the present invention, the polymer electrical storage device can be recharged by exposure to light, the polymers are ideally suited for solar applications. The polymer electrical storage device of the present invention that is capable of being charged by exposure to light is much more efficient than conventional, commercially available cells. The commercial cell converts only about 15% of the sunlight striking the cell to electricity. The light-chargeable polymer electrical storage device does not utilize expensive silicon and does not utilize environmentally harmful chemicals as does the conventional silicon-based solar cell.

The present invention also includes a conductive, non-metal polymer that can be used as an electrode in the present invention (See Example III). The conductive, non-metal polymer of the present invention can be prepared so that the resulting polymer is colorless and is therefore useful as a coating for any application wherein static electricity is a problem.

Generally, the conductive polymer is prepared by first preparing a prepolymer solution comprising ammonium persulfate in hydrochloric acid. In a separate container, distilled aniline is mixed with hydrochloric acid. The aniline solution is then added to the ammonium persulfate solution. The mixture is cooled and stirred. The temperature of the solution is then raised for a period of time and then cooled and stirred for 45 minutes. The resulting polyaniline precipitate is then washed several times by filtration with distilled water. The precipitate is then dried under vacuum.

To form the conductive polymer film, potassium hydroxide is added and the resulting mixture is stirred for three hours. The precipitate is filtered and washed several times with water. The filtrate is then dried. The dried powder is then dissolved in N-methyl pyrolidone. To form the film, the polyvinyl alcohol is dissolved in a solution of 50% water and 50% ethylene glycol. After dissolving the polyvinyl alcohol, concentrated sulfuric acid is added to the solution and stirred. The solution is then cooled and 5–15% by volume of the prepolymer solution is added to the polyvinyl alcohol mixture. The percentage of prepolymer solution is not critical. The mixture is then spread on glass plates and allowed to polymerize. The resulting film can then be removed from the plates. An alternative method of forming a film is to add 1–5% of an aldehyde such as formaldehyde, and spread the solution on glass plates and allow the solution to polymerize.

This invention is further illustrated by the following examples, which are not to be construed in any way as imposing limitations upon the scope thereof. All chemicals can be obtained from Aldrich Chemical Company, Milwaukee, Wis. unless otherwise indicated. On the contrary, it is to be clearly understood that resort may be had to various other embodiments, modifications, and equivalents thereof which, after reading the description here, may suggest themselves to those skilled in the art without departing from the spirit of the present invention and/or the scope of the appended claims.

EXAMPLE I

To produce the polymer capable of storing a charge, 25 ml of acetonitrile, 2 ml of pyrrole, 1 ml of 1 M NaCl and 2 ml of an 0.083 M p-toluene sulfonic acid are mixed. 20 ml of additional acetonitrile is then added. The mixture is stirred until the components are dissolved. The polymer film is then formed on a stainless steel plate by electrosynthesis. 8 to 10 volts DC is applied to the plate for 10 seconds. The voltage is then lowered to approximately 4.25 volts for 12 minutes. 1 ml of the p-toluene sulfonic acid is then added and 4.25 volts is applied to the stainless steel plate for 2 hours. The film is removed and rinsed with acetonitrile.

The film is then soaked in a 1 M $FeCl_3$ for 20 seconds at room temperature. The film is then removed from solution and the excess $FeCl_3$ solution is removed by washing with the acetonitrile. The membrane is then soaked in aniline-ethylacetate (50:50 wt %) for 20 minutes. The last process is repeated 5 to 10 times. The resulting layered film is then immersed in 1 molar $Al_2SO_4$ and apply 4 volts for 20 minutes.

An alternative is that after two hours, ½ ml of aniline solution is then added and 4.25 volts is applied to the stainless steel electrode for 5 more minutes. 3 volts DC is applied to the film for one hour.

EXAMPLE II

Preparation of the Solid Electrolyte

A solid electrolyte is prepared by dissolving 1 ml of polyacrylic acid in 20 mls of pure water to form a gel. 10 mls of 0.5 to 1 M aqueous solution of polyvinyl alcohol is then added.

After mixing, 10 mls of a one molar solution of phosphoric acid is then added. The resulting solution should be non-viscous. Polyacrylic acid is then added until a viscous gel is formed. The polyacrylic acid is then polymerized. The solid electrolyte is then applied to the film of Example I and a charge is applied for 5 seconds. At 1.2 volts, the battery produces 15 millifarads.

EXAMPLE III
Preparation of a Conductive Polymer

To produce a conductive polymer for the inactive electrode, a prepolymer solution is prepared by dissolving 12 g ammonium persulfate in 250 ml of 1 M HCl. The solution is then placed in a three-necked flask and is purged with nitrogen and cooled to 5° C. In a separate container, 21 ml of distilled aniline is mixed with 300 mls of 1 m HCl. The container is purged with aniline. The aniline solution is then added to the three-necked flask. The mixture is cooled to 0° C. and stirred for one hour. The temperature of the solution is then raised to 8 to 10° C. for 15 minutes. The solution is then cooled to 0° C. and stirred for 45 minutes. The polyaniline precipitate is then washed several times by filtration with distilled water. The precipitate is then dried under vacuum at 50° C. for at least 12 hours. 2 liters of 1 M potassium hydroxide is added and stirred for 3 hours. The precipitate is filtered and washed several times with water. The filtrate is then dried. The dried powder is then dissolved in N-methyl pyrolidone.

To form a film, 50% by weight of polyvinyl alcohol is dissolved in a solution of 50% water and 50% ethylene glycol. After dissolving the polyvinyl alcohol, 10% by volume of concentrated sulfuric acid is added to the solution and stirred. The solution is then cooled to 0° C. After cooling, 5 to 15% by volume of the prepolymer solution is added to the polyvinyl alcohol mixture. The mixture is then spread on glass plates and allowed to polymerize. The resulting film can then be removed from the plates.

An alternative method of forming a film is to add 1% to 5% of an aldehyde, such as formaldehyde, and spread the solution on glass plates and allow the solution to polymerize.

EXAMPLE IV
Preparation of Polymer Electrical Storage Device that is Chargeable, Optionally by Light.

20 ml of acetonitrile (5% in water) and 3 ml of double distilled pyrrole and 2 ml of mercaptan are mixed together and then 0.1 ml sodium chloride solution and then 20 ml of acetonitrile are added to the solution. The temperature should, at this point, be approximately 5° C. A cathode is inserted into the acetonitrile/pyrrole solution. The cathode is comprised of stainless steel and is approximately 1 cm square.

Two anodes are inserted into the solution, one anode on either side of the cathode. Two volts are applied to the electrodes that are immersed in the beaker for two hours. After two hours, a film forms on the cathode. The cathode is rinsed and placed in another beaker with the following solution: 5 ml of acetonitrile, 2 ml of pyrrole, 20 ml of 1 molar sodium chloride, 10 ml of $H_2O$, and to that solution 2 ml of acetonitrile is added. At room temperature, there is a phase separation with acetonitrile being in the upper phase. The electrodes are adjusted so that the top of the cathode is in the top acetonitrile phase. Five volts are applied to the electrodes for two hours. The polymerization process occurs first at the phase separation and the resulting polymer is generally spherical in shape. After the polymerization step is completed, the resulting polymer is washed several times in water and is ready to be used in the electrical storage device.

EXAMPLE V
Preparation of the Electrolyte Gel.

Zinc chloride is dissolved to saturation in 10 to 20 ml of polyvinyl alcohol (PVA). After zinc chloride is dissolved to saturation, water is added to the $PVA/ZnCl_2$ solution until a solution of 50% water and 50% PVA is obtained. Polyacrylic acid is then added until a gel is formed. Normally, about 20 to 50% by volume of polyacrylic acid is required to form an acceptable gel.

EXAMPLE VI
Preparation of the Polymer Electrical Storage Device.

The polymer from Example IV, is coated with the electrolyte gel from Example V and a zinc coated steel plate with approximately the same size as the polymer is applied to the gel. The polymer electrical storage device then exposed to light to charge the electrical storage device. It is to be noted that the electrical storage device can also be charged by conventional means by applying an electrical current to the polymer. The electrical storage device delivered 3 milliamps at 1.4 volts and, in an electrical storage device that is slightly larger than the storage device described in Examples IV through VI, the storage device delivered 400 milliamps at 3 volts.

Various changes and modifications may be made in the details of the construction of the polymer electrical storage device of the present invention without departing from the spirit and scope of the invention as defined by the appended claims.

What is claimed is:

1. A polymer electrical storage device comprising a polymer composition which is capable of storing an electrical charge, wherein said polymer composition is prepared by a method comprising:

preparing a solution containing pyrrole, sodium chloride and p-toluene sulfonic acid in acetonitrile;

inserting a metal plate at least partially within the solution; and applying a voltage across the metal plate to form a polymer film on the metal plate; and removing and rinsing the polymer-coated metal plate.

2. The polymer electrical storage device of claim 1, wherein the polymer can be charged with an electric current.

3. The polymer electrical storage device of claim 1, wherein the device further comprises a solid electrolyte.

4. The polymer electrical storage device of claim 1, wherein the metal plate is stainless steel.

5. A polymer electrical storage device comprising a polymer composition which is capable of storing an electrical charge, wherein said polymer composition is prepared by a method comprising:

preparing a solution containing pyrrole and mercaptan in acetonitrile;

applying a voltage across a cathode and at least one anode, which are at least partially positioned within the solution, to form a polymer film on the cathode;

removing and rinsing the cathode;

immersing the cathode in a second solution containing pyrrole, sodium chloride, water and acetonitrile, wherein an upper portion of the cathode is positioned in an upper acetonitrile phase of the second solution;

applying a second voltage across the cathode to form additional polymer; and removing and rinsing the cathode coated with polymer film.

6. The polymer electrical storage device of claim 5, wherein the polymer composition is charged by exposure to visible light.

7. The polymer electrical storage device of claim 5, wherein the device further comprises a gel electrolyte.

8. The polymer electrical storage device of claim 7, wherein the gel electrolyte comprises a solution of $ZnCl_2$, polyvinyl alcohol and polyacrylic acid.

9. The polymer electrical storage device of claim 1, wherein the polymer composition forms one or more layers on the metal plate.

10. The polymer electrical storage device of claim 9, wherein the polymer composition forms two or more layers on the metal plate, wherein each layer of polymer composition is separated by a molecular layer of $FeCl_3$.

11. The polymer electrical storage device of claim 1, wherein the polymer electrical storage device is approximately 1 $cm^2$ and 4 mils. thick, and produces about 1.5 volts.

12. The polymer electrical storage device of claim 3, wherein the solid or gel electrolyte is applied to the polymer-coated metal plate to form an electrical storage device.

13. The polymer electrical storage device of claim 12, wherein the solid electrolyte comprises $ZnCl_2$, polyvinyl alcohol and polyacrylic acid.

14. The polymer electrical storage device of claim 1, wherein the method further comprises:

(a) soaking the polymer-coated metal plate in a $FeCl_3$ solution;

(b) washing the polymer-coated metal plate with acetonitrile; and (c) soaking the polymer-coated metal plate in an aniline-ethylacetate solution.

15. The polymer electrical storage device of claim 14, wherein steps (a) to (c) are repeated 5 to 10 times.

16. The polymer electrical storage device of claim 7, wherein the anode of the device comprises a zinc-coated steel plate.

17. The polymer electrical storage device of claim 7, wherein the cathode of the device comprises the cathode coated with polymer film.

18. The polymer electrical storage device of claim 7, wherein the device delivers 300 milliamps at 1.4 volts.

19. The polymer electrical storage device of claim 1, wherein one electrode of the device comprises a conductive polymer, said conductive polymer is an electropolymerization product resulting from a reaction of polyaniline and polyvinyl alcohol.

20. The polymer electrical storage device of claim 3, wherein the solid electrolyte comprises an electropolymerization product resulting from a reaction of polyacrylic acid, polyvinyl alcohol and phosphoric acid.

21. A polymer electrical storage device comprising a polymer composition having an electropolymerization product of a solution comprising pyrrole, sodium chloride and p-toluene sulfonic acid.

22. The polymer electrical storage device of claim 21, wherein the solution further comprises acetonitrile.

23. The polymer electrical storage device of claim 21, further comprising a metal plate.

24. The polymer electrical storage device of claim 23, wherein the metal plate is a stainless steel plate.

25. The polymer electrical storage device of claim 23, herein the polymer composition comprises one or more layers disposed on the metal plate.

26. The polymer electrical storage device of claim 25, further comprising a molecular layer of $FeCl_3$ disposed between the layers of the polymer composition.

27. The polymer electrical storage device of claim 21, wherein the device further comprises a solid or gel electrolyte.

28. The polymer electrical storage device of claim 27, wherein the solid or gel electrolyte comprises $ZnCl_2$, polyvinyl alcohol and polyacrylic acid.

29. The polymer electrical storage device of claim 27, wherein the solid electrolyte comprises an electropolymerization product of polyacrylic acid, polyvinyl alcohol and phosphoric acid.

30. The polymer electrical storage device of claim 21, further comprising at least one conductive polymer electrode comprising an electropolymerization product of polyaniline and polyvinyl alcohol.

31. The polymer electrical storage device of claim 21, wherein the polymer composition is chargeable by an electric current.

32. A polymer electrical storage device comprising a polymer composition having a first electropolymerization product of a solution comprising pyrrole and mercaptan and a second electropolymerization product of a solution comprising pyrrole, sodium chloride and water, wherein the first electropolymerization is an electropolymerization product of a solution comprising pyrrole, mercaptan and sodium chloride.

33. The polymer electrical storage device of claim 22, wherein each solution further comprises acetonitrile.

34. The polymer electrical storage device of claim 22, further comprising an electrolyte.

35. The polymer electrical storage device of claim 34, wherein the electrolyte comprises an electropolymerization product of a solution comprising $ZnCl_2$, polyvinyl alcohol and acrylic acid.

36. The polymer electrical storage device of claim 22, wherein the electrolyte comprises an electropolymerization product of a solution comprising $ZnCl_2$, polyvinyl alcohol, water and acrylic acid.

37. The polymer electrical storage device of claim 22, further comprising a cathode and an anode.

38. The polymer electrical storage device of claim 37, wherein the anode is a zinc-coated steel plate.

39. The polymer electrical storage device of claim 37, wherein the cathode comprises the polymer composition.

40. The polymer electrical storage device of claim 22, wherein the polymer composition is chargable by an electric current operably connected thereto, exposure to light or a combination thereof.

* * * * *